United States Patent [19]

Griesemer

[11] 4,052,725

[45] Oct. 4, 1977

[54] CATHODE-RAY TUBE SCREENING EXPOSURE METHOD

[75] Inventor: Douglas Earl Griesemer, Lancaster, Pa.

[73] Assignee: RCA Corporation, New York, N.Y.

[21] Appl. No.: 710,672

[22] Filed: Aug. 2, 1976

[51] Int. Cl.$^{2}$ .............................................. G03B 41/00

[52] U.S. Cl. .......................................... 354/1; 96/36.1

[58] Field of Search .............................. 354/1; 96/36.1

[56] References Cited

U.S. PATENT DOCUMENTS 3,636,836 1/1972 Maddox .................................. 354/1

FOREIGN PATENT DOCUMENTS 959,692 12/1974 Canada .................................... 354/1

*Primary Examiner*—Edna M. O'Connor

*Attorney, Agent, or Firm*—Glenn H. Bruestle; Dennis H. Irlbeck

[57] ABSTRACT

An improvement in a method of making a luminescent screen structure for a cathode-ray tube is disclosed. The tube has a faceplate panel and an apertured color selection electrode in a predetermined position spaced from the panel. A photosensitive composition is coated on a surface of the panel. The solubility of the composition is altered when exposed to light through the electrode. The improvement comprises sensing the strength of a magnetic field passing through the electrode and adjusting the time and/or intensity of the exposure light as a function of the sensed strength of the magnetic field.

5 Claims, 2 Drawing Figures

CATHODE-RAY TUBE SCREENING EXPOSURE METHOD

BACKGROUND OF THE INVENTION

This invention relates to an improved method of making a luminescent screen structure for a cathode-ray tube and particularly, to a method of controlling exposure time in a screening lighthouse to account for variations in apertured color selection electrodes.

The direct photographic method for preparing a matrix or a phosphor screen usually includes coating the inner surface of the faceplate of a cathode-ray tube with a film of photosensitive material composition (typically comprising a dichromate-sensitized polyvinyl alcohol). A mask assembly is positioned in the faceplate and the entire panel assembly placed on a lighthouse. Multiple light beams projected through an aperture mask expose multiple areas corresponding to the apertures in the mask on selected regions of the film. After exposure, the panel assembly is removed from the lighthouse, and the film is flushed with water to remove the still soluble regions while retaining the insoluble regions in place.

Ideally, the exposed patterns formed on the film by each of the multiple light beams are of a desired size and shape. In practice, the ideal is not achieved, resulting in an exposed pattern of a different size and shape from each beam. This deviation from ideal is at least partly caused by variations in mask transmission. These variations in mask transmission may produce variations in the size of the exposed areas of the film. Generally, the greater the mask transmission, the larger the size of the exposed area.

When the mask light transmission is measured during the exposure, additional variations may be introduced by transients and nonequilibrium conditions in the measuring system. Also, variables may be introduced when the exposure cycle is not duplicated in successive exposures.

Such problems were partially overcome by the disclosure of U.S. Pat. No. 3,636,836 issued to W. J. Maddox et al. on Jan. 25, 1972. In this patent, the intensity level of the light transmitted through the faceplate is sensed with a photosensor and the light source is continuously adjusted to produce a desired luminence on the film. A disadvantage of such a method is that the sensed light must pass through layers of film and perhaps phosphor particles before it reaches the photosensor. Variations in film and/or phosphor thickness can affect the intensity of the sensed light. Therefore, there is a need for a light exposure control method that will not be limited by the foregoing disadvantages.

SUMMARY OF THE INVENTION

The invention is an improvement in a method of making a luminescent screen structure for a cathode-ray tube. The tube has a faceplate panel and an apertured color selection electrode in a predetermined position spaced from the panel. A photosensitive composition is coated on a surface of the panel. The solubility of the composition is altered when exposed to light through the electrode. The improvement comprises sensing the strength of a magnetic field passing through the electrode and adjusting the time and/or intensity of the exposure light as a function of the sensed strength of the magnetic field.

DESCRIPTION OF THE PREFERRED EMBODIMENT

Figure 1:
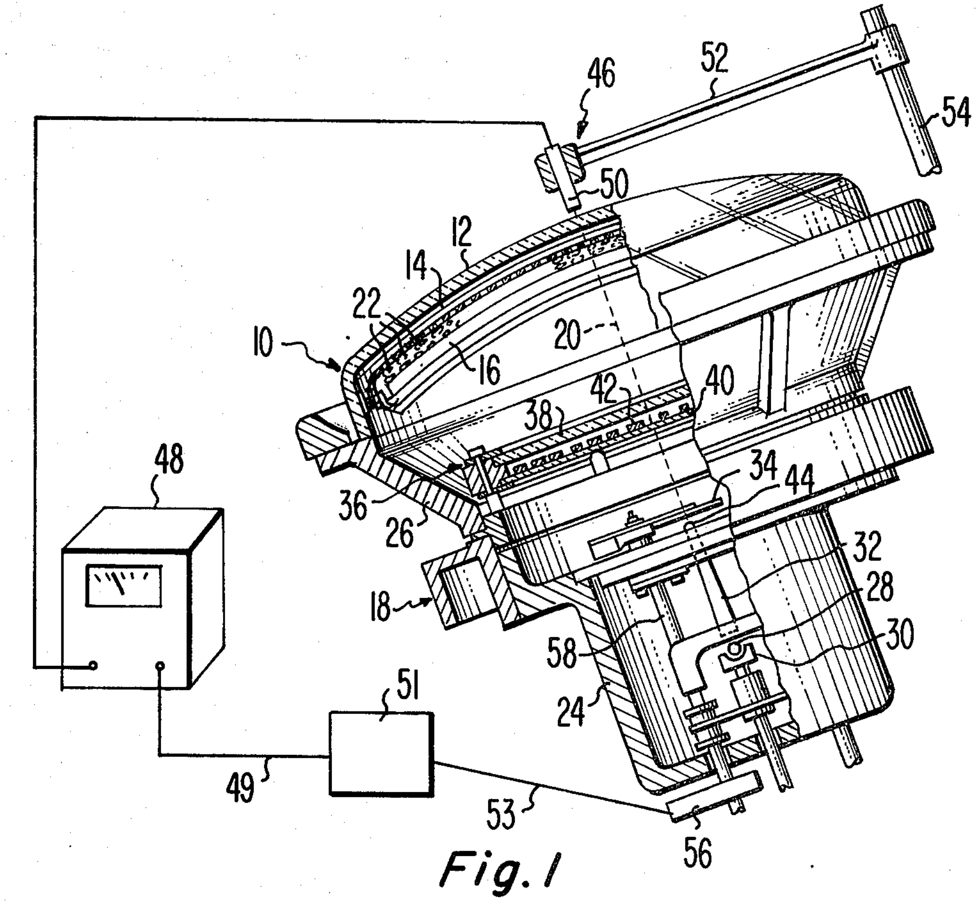
FIG. 1 is an elevational view, partly in section of a lighthouse showing the mask and screen structure of a color television picture tube with photosensitive film.

Referring to FIG. 1, there is shown a faceplate assembly 10 comprising a faceplate panel 12, a photosensitive film 14 on the inner surface of the panel 12, and a color selection electrode or apertured mask 16 positioned near and spaced from the photosensitive film 14. The faceplate assembly 10 is shown positioned on a photoexposure apparatus known in the art as a "lighthouse" 18. The lighthouse 18 is designed to expose the film 14 by projecting light from a small area light source incident on the mask 16 permitting beamlets 20 of light to pass through the apertures 22 to form a pattern substantially of the same shape as the apertures 22 in the mask 16 on the film 14.

The lighthouse 15 comprises a housing 24 which includes a panel support 26, a light source 28, a reflector 30, a collimator 32, an eclipser 34 and a lens assembly 36. The panel support 26 is adapted to support the faceplate panel 12 accurately aligned over the light source 28 as shown in FIG. 1. The lens assembly 36 includes a correction lens 38, a wedge lens 40 and a light filter 42 on the upper surface of the wedge lens 40. The collimator 32 comprises a light pipe in the form of a tapered glass rod with the narrow end 44 constituting a small area source of light for the lighthouse 18. the eclipser 34 is operated to interrupt the light projected upon the photosensitive film 14. The collimator 32, eclipser 34 and lens assembly 36 are between the light source 28 and the faceplate assembly 10. The reflector 30 is positioned below the light source 28.

FIG. 1 includes a lighthouse exposure control system. The control system comprises a magnetic sensor assembly 46, a gaussmeter 48 and a timing circuit 51. The magnetic sensor assembly 46 comprises a magnetometer 50 mounted at one end of an arm 52. The arm 52 is attached to a shaft 54 which is pivotally mounted to the housing 24.

The magnetometer 50 is connected to the gaussmeter 48 which in turn is connected by lead 49 to the input of the timing circuit 51. The output of the timing circuit 51 is connected by a lead 53 to a solenoid 56 for activating the eclipser 34 in the lighthouse 18 through rotation of a shaft 58 to which the eclipser 34 is attached.

Figure 2:
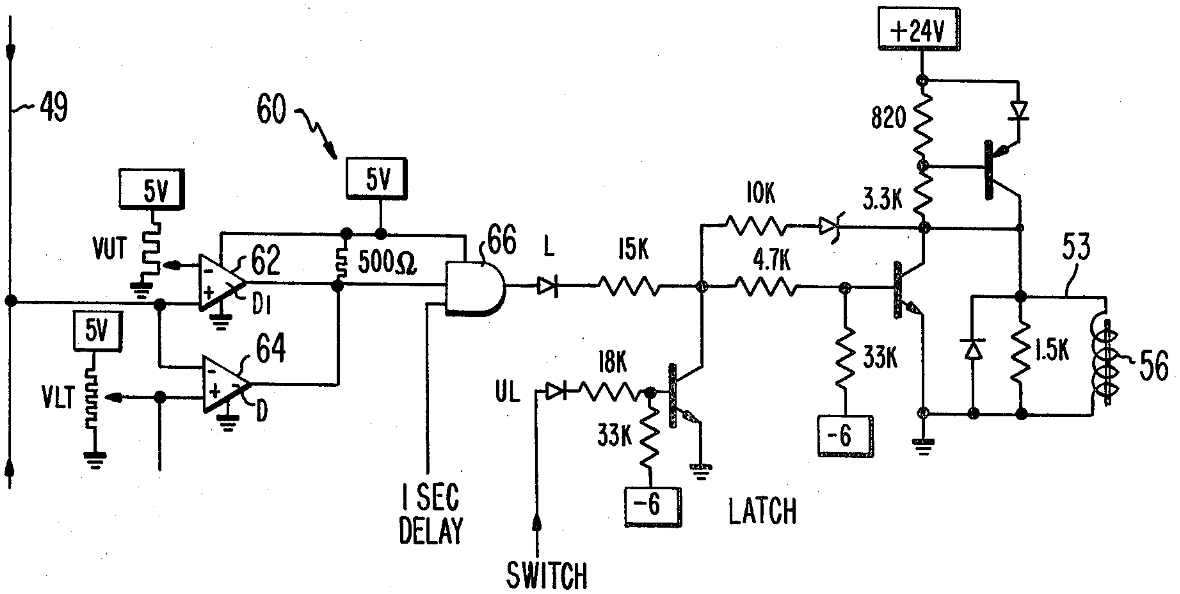
FIG. 2 is a schematic diagram of a portion of a circuit for controlling exposure time.

A schematic of a portion 60 of the timing circuit 51 is shown in FIG. 2. A complete circuit 51 consists of a plurality of portions 60 connected in parallel. Each portion has a pair of differential amplifiers 62 and 64 which are biased, respectively, with upper and lower voltage limits. An incoming signal on lead 49 is compared by the differential amplifiers 62 and 64 to the bias voltages. If the signal voltage falls above or below he limits established by the biasing, the remainder of the circuit portion will remain inactive. However, another parallel portion may then be activated if the signal voltage is within the voltage limits established for that particular portion. When a circuit portion is activated, a timer 66 is started that is preset for a time correlated to the magnetic field sensed by the magnetometer 50. The output of the timer 66 is amplified by the remainder of the circuit portion and the output is connected by the lead 53 to the solenoid 56.

EXAMPLE

Before the faceplate panel 12 is placed on the lighthouse 18, the arm 52 is rotated away from over the lighthouse 18 and the eclipser 34 covers the narrow end 44 of the collimator 32. At this stage, the inside wall of the faceplate panel 12 is coated with a photosensitive material that may carry either a dark light-absorbing material or phosphor particles and the apertured mask 16 is mounted within the faceplae panel 12. The faceplate panel 12 is now positioned on the lighthouse 18 having its orientation determined by locating stops on the lighthouse. Next, the arm 52 is swung over the faceplate panel 12, so that the magnetometer 50 is located directly over the center of the panel 12, and the gaussmeter 48 is activated. The magnetic field sensed by the magnetometer 50 is a direct function of the size of the apertures within the mask 16 with larger apertures permitting greater portions of the Earth's magnetic field to pass through the mask. The strength of the sensed magnetic field can be visually read from the meter on the gaussmeter 48 and the exposure time manually varied to compensate for variations in aperture size. Alternately, as shown in the drawings, the gaussmeter output can be used to automatically control exposure time through functioning of the timing control circuit 51. Each portion 60 of the control circuit 51 is set with an upper and lower limit. Such limits are set by adjusting the two input potentiometers VUT and VLT with the VUT potentiometer of a portion set at a slightly lower level than the VLT pontentiometer of the preceding adjacent portion. This way a full range of expected gaussmeter outputs can be covered by the various portions of the circuit 51. When a circuit portion 60 becomes activated, the timer 66 then permits current flow for a predetermined time which will provide sufficient exposure for a mask having aperture sizes falling within a specific range. At the completion of the alloted exposure time, the timer 66 cuts off thus stopping the flow of current to the solenoid 56 which in turn moves the eclipser 34 back to a position where it covers the collimator 32.

Although the foregoing example has been given with respect to controlling the time of exposure, it should be understood that light intensity could also be controlled while holding exposure time constant.

I claim:

1. In a lighthouse method of making a luminescent screen structure for cathode-ray tube having a faceplate panel and an apertured color selection electrode in a predetermined position spaced from said panel wherein a photosensitive composition is coated on a surface of said panel, said composition having a solubility which is altered when exposed to light through said color selection electrode, the improvement comprising, sensing the strength of a magnetic field passing through said color selection electrode and adjusting the degree of exposure of said composition to said light as a function of the sensed strength of the magnetic field.

2. The method as defined in claim 1 wherein the time of exposure is adjusted.

3. The method as defined in claim 1 wherein light intensity is adjusted.

4. The method as defined in claim 1 wherein the degree of exposure is adjusted manually.

5. The method as defined in claim 1 wherein the degree of exposure is adjusted automatically by an electrical timing circuit.

* * * * *